US007529938B2

(12) United States Patent
Shibata et al.

(10) Patent No.: US 7,529,938 B2
(45) Date of Patent: May 5, 2009

(54) METHOD, APPARATUS AND SYSTEM FOR PERFORMING AUTHENTICATION ACCORDING TO CHALLENGE-RESPONSE PROTOCOL USING SCRAMBLED ACCESS INFORMATION

(75) Inventors: Osamu Shibata, Moriguchi (JP); Taihei Yugawa, Nara (JP); Tsutomu Sekibe, Hirakata (JP); Teruto Hirota, Moriguchi (JP); Yoshiyuki Saito, Katano (JP); Toshihiko Otake, Hyogo (JP)

(73) Assignee: Panasonic Corporation, Osaka (JP)

( * ) Notice: Subject to any disclaimer, the term of this patent is extended or adjusted under 35 U.S.C. 154(b) by 1305 days.

(21) Appl. No.: 09/936,157

(22) PCT Filed: Jan. 12, 2001

(86) PCT No.: PCT/JP01/00159

§ 371 (c)(1),
(2), (4) Date: Sep. 6, 2001

(87) PCT Pub. No.: WO01/52474

PCT Pub. Date: Jul. 19, 2001

(65) Prior Publication Data
US 2003/0061519 A1   Mar. 27, 2003

(30) Foreign Application Priority Data
Jan. 14, 2000 (JP) ............................... 2000-006989
Feb. 18, 2000 (JP) ............................... 2000-041317

(51) Int. Cl.
*H04L 9/00* (2006.01)
*G06F 12/14* (2006.01)
*G06F 17/30* (2006.01)
*H04N 7/167* (2006.01)
*H04K 1/00* (2006.01)

(52) U.S. Cl. ............... 713/169; 713/165; 713/190; 380/201; 380/232; 380/255; 380/262; 705/57; 707/9

(58) Field of Classification Search ................ 713/169, 713/165, 170; 707/9; 380/262
See application file for complete search history.

(56) References Cited

U.S. PATENT DOCUMENTS 4,683,968 A * 8/1987 Appelbaum et al. ............. 380/4

(Continued)

FOREIGN PATENT DOCUMENTS

EP           0768775           4/1997

(Continued)

OTHER PUBLICATIONS

Anonymous, Digital Music Industry Leaders Line up to Support iPIN's E-Content System, PR Newswire, pp. 1-2.*

(Continued)

*Primary Examiner*—Christopher A Revak
*Assistant Examiner*—Aravind K Moorthy

(57) ABSTRACT

An authentication communication system includes an storage medium having an area for storing digital information and an access device for reading/writing digital information from/into the area. The access device authenticates whether the storage medium is authorized according to a challenge-response authentication protocol in which scrambled access information generated by scrambling the access information which shows the area is used. The storage medium authenticates whether the access device is authorized. When the access device and the storage medium have authenticated each other as authorized devices, the access device reads/writes digital information from/into the area in the storage medium according to the access information separated from the scrambled access information by the access device.

7 Claims, 10 Drawing Sheets

U.S. PATENT DOCUMENTS

| | | | | |
|---|---|---|---|---|
| 5,065,429 A | * | 11/1991 | Lang | 380/25 |
| 5,193,115 A | * | 3/1993 | Vobach | 380/46 |
| 5,638,448 A | * | 6/1997 | Nguyen | 380/29 |
| 5,649,185 A | * | 7/1997 | Antognini et al. | 395/609 |
| 5,745,571 A | * | 4/1998 | Zuk | 380/21 |
| 5,872,917 A | * | 2/1999 | Hellman | 726/6 |
| 5,935,246 A | * | 8/1999 | Benson | 713/200 |
| 6,052,466 A | * | 4/2000 | Wright | 380/262 |
| 6,058,476 A | | 5/2000 | Matsuzaki et al. | |
| 6,061,449 A | * | 5/2000 | Candelore et al. | 380/28 |
| 6,144,739 A | * | 11/2000 | Witt et al. | 380/2 |
| 6,148,404 A | * | 11/2000 | Yatsukawa | 726/2 |
| 6,289,455 B1 | * | 9/2001 | Kocher et al. | 713/194 |
| 6,374,399 B1 | * | 4/2002 | Mann | 717/127 |
| 6,442,626 B1 | * | 8/2002 | Smola et al. | 710/36 |
| 6,487,663 B1 | * | 11/2002 | Jaisimha et al. | 713/193 |
| 6,687,683 B1 | * | 2/2004 | Harada et al. | 705/51 |

FOREIGN PATENT DOCUMENTS

| | | |
|---|---|---|
| EP | 0802535 | 10/1997 |
| EP | 0809379 | 11/1997 |
| JP | 7-311674 | 11/1995 |
| JP | 8-56387 | 2/1996 |
| JP | 10-51439 | 2/1998 |
| JP | 11-265317 | 9/1999 |
| JP | 11-306673 | 11/1999 |

OTHER PUBLICATIONS

Anonymous, Reciprocal Announces Endorsement of Sony's Interoperable And Secure Electronic Music Distribution, PR Newswire, pp. 1-2.*

Rosnay, Melanie, Digital Right Management Systems Toward European Law: between Copyright Protection and Access Control, 2002, Paris X Law University, pp. 1-8.*

Yamanaka, Kiyoshi, et al.; "Copyright Protection in Multimedia on Demand Services"; NTT Human Interface Laboratories, Japan, 1995, NTT R & D, vol. 44, No. 9, pp. 813-819, with English Abstract.

* cited by examiner

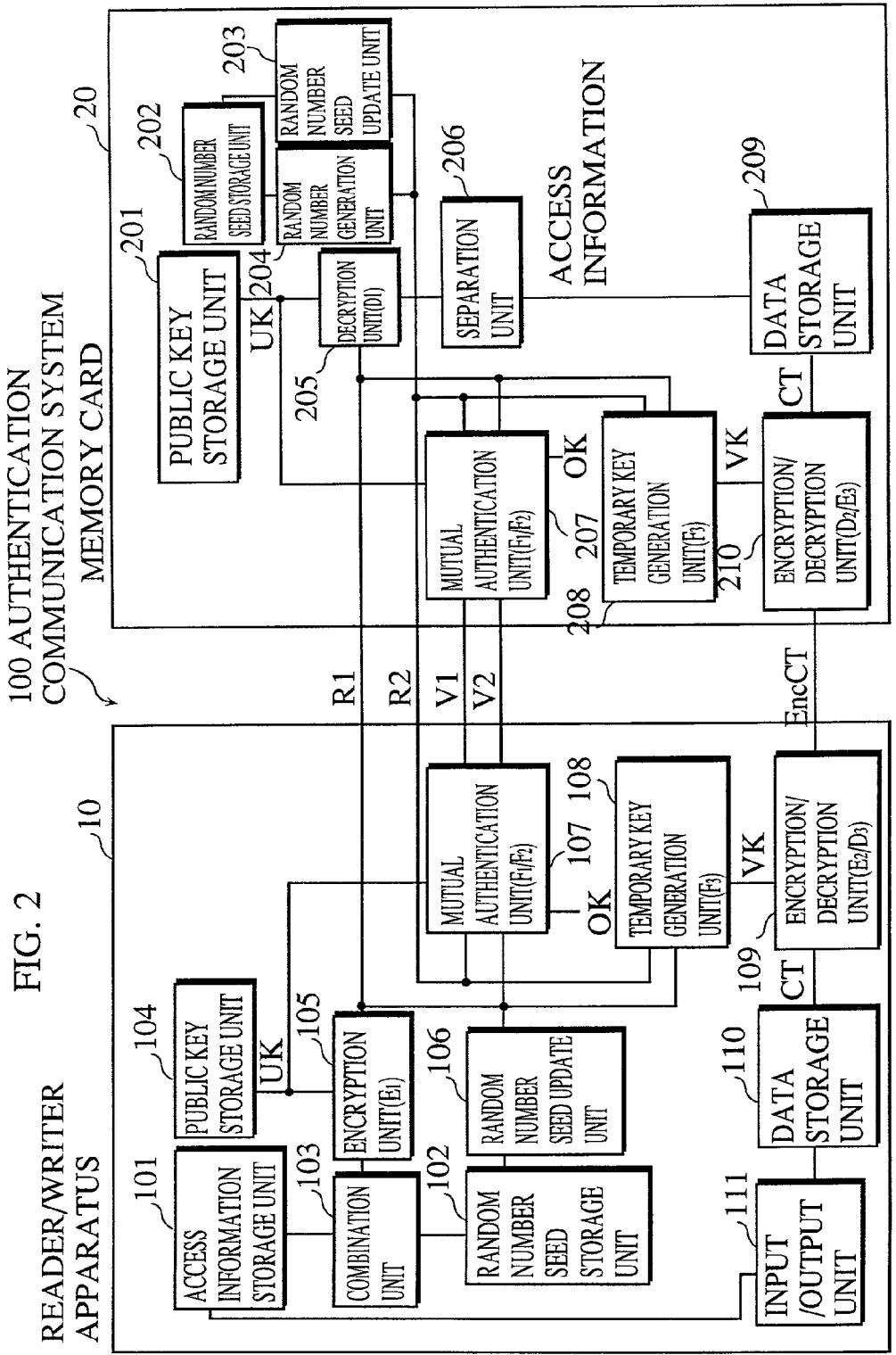

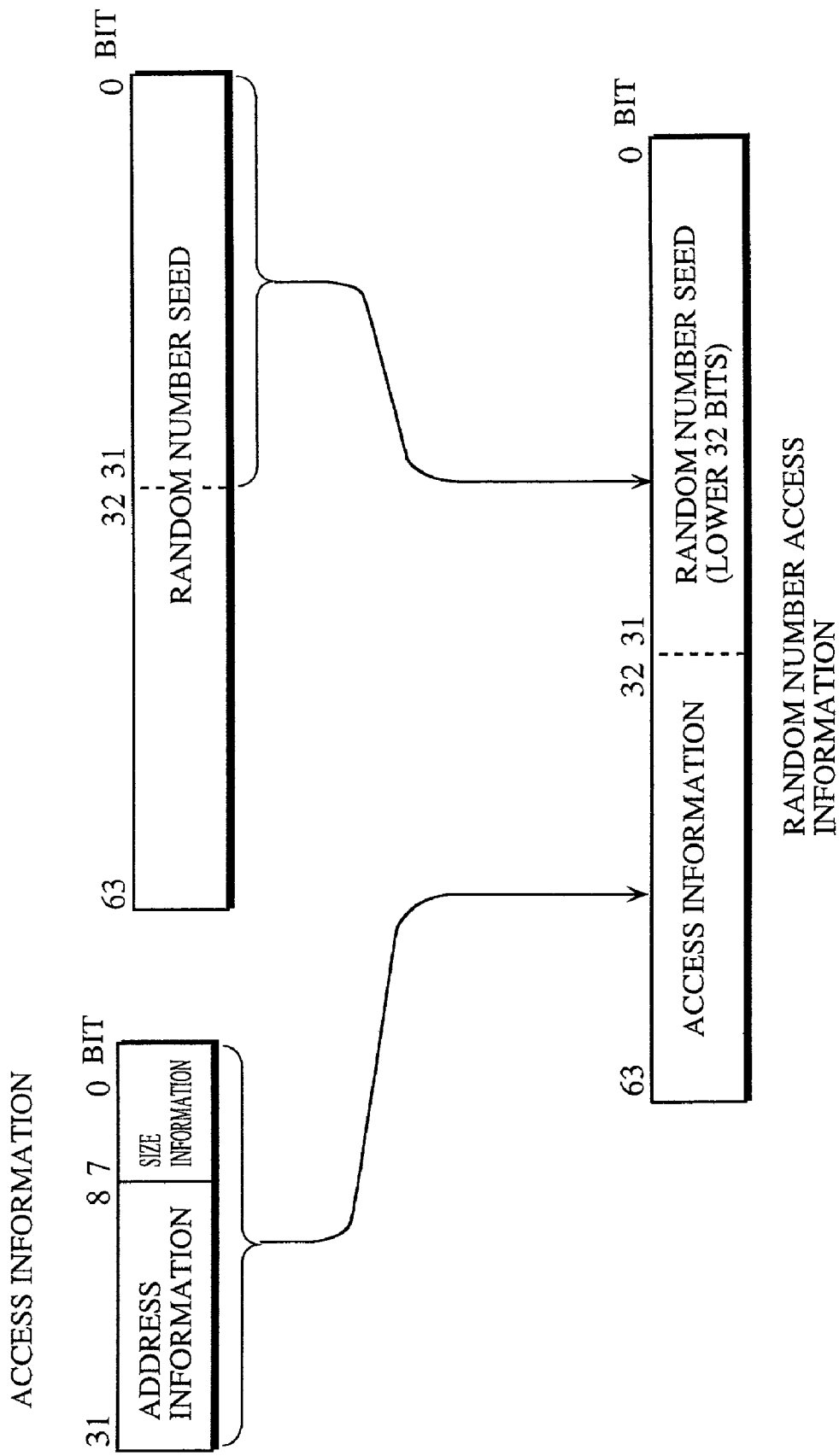

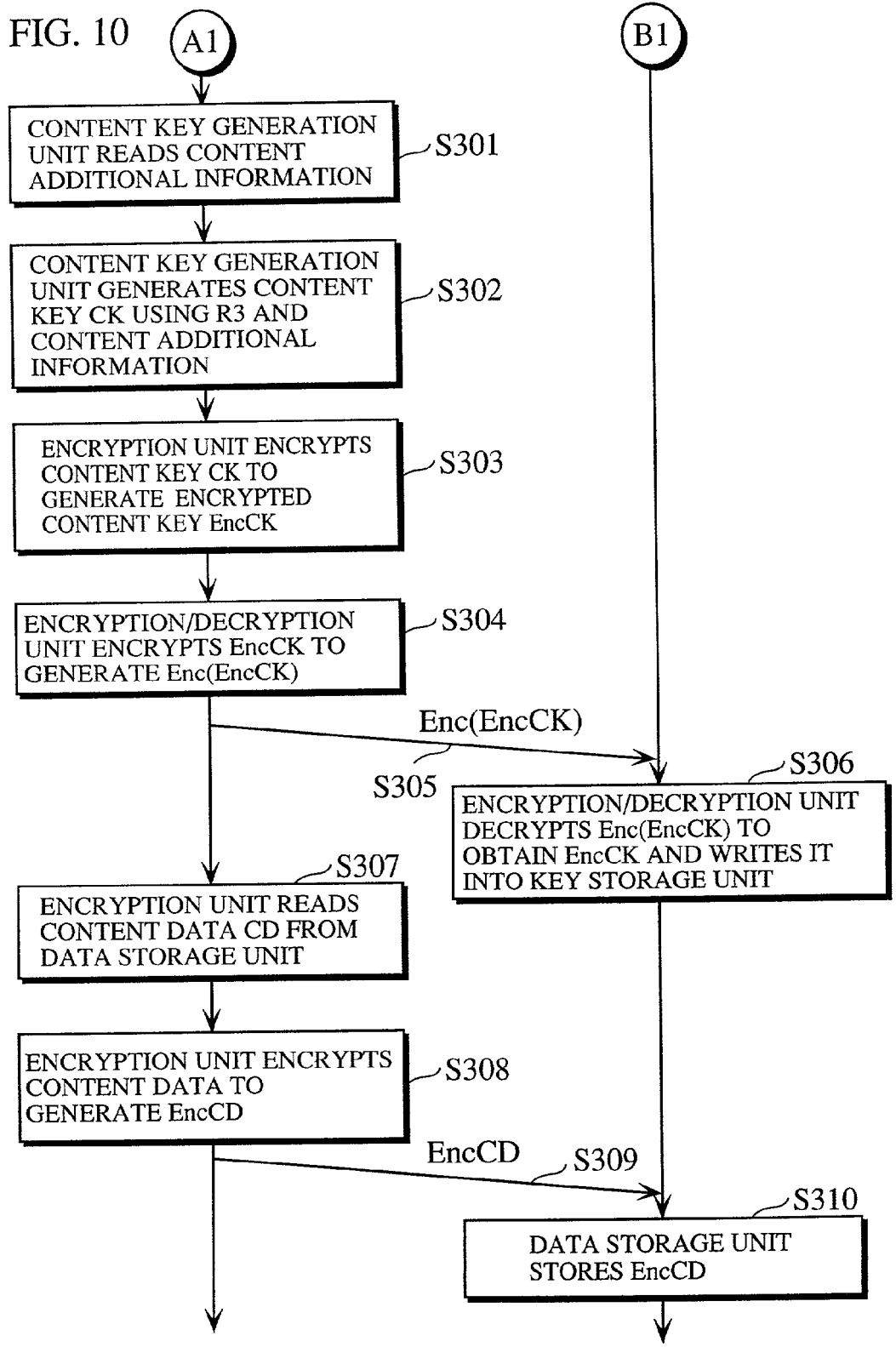

US 7,529,938 B2

METHOD, APPARATUS AND SYSTEM FOR PERFORMING AUTHENTICATION ACCORDING TO CHALLENGE-RESPONSE PROTOCOL USING SCRAMBLED ACCESS INFORMATION

TECHNICAL FIELD

The present invention relates to a technique of mutual authentication between a device and a storage medium, before digital copyright works are transferred between them.

BACKGROUND ART

In recent years, as a result of progress in digital information compression techniques and widespread use of global communication infrastructures such as the Internet, copyright works such as music, images, video, and games are distributed via communication lines to households as digital copyright works.

In order to establish a distribution system which protects the rights of copyright holders of digital copyright works and the profits of distributors, it is critical to prevent dishonest acts such as acquisition of a digital copyright work by communication interception, wiretapping, impersonation, and duplication and tampering of data received and stored in a storage medium. Therefore, copyright protection techniques, such as encryption and authentication for authenticating whether a system is authorized and scrambling data, are needed.

A variety of copyright protection techniques have been conventionally used. A representative technique is a challenge-response mutual authentication technique. In this technique, when accessing a confidential data storage area storing confidential data which requires copyright protection, a random number and a response value are exchanged between devices to mutually authenticate whether the other of them is authorized. The access is permitted only when the authentication is successful.

After the mutual authentication has been carried out between the authorized devices, an unauthorized party may impersonate one of the authorized device and dishonestly acquire confidential data by accessing the confidential data storage area.

DISCLOSURE OF THE INVENTION

The present invention has been made in view of these problems. The object of the present invention is to provide an access device, a storage medium, an authentication communication system, an authentication communication method, and a storage medium storing an authentication communication program which prevent information for accessing a confidential data storage area from being leaked.

In order to achieve the above object, the present invention is an authentication communication system which is roughly composed of (a) a storage medium having an area for storing digital information and (b) an access device for reading/writing digital information from/into the area, the authentication communication system including: a first authentication phase in which the access device authenticates whether the storage medium is authorized according to a challenge-response authentication protocol by transmitting scrambled access information generated by scrambling access information which shows the area, to the storage medium; a second authentication phase in which the storage medium authenticates whether the access device is authorized; and a transfer phase in which, when the storage medium and the access device have authenticated each other as authorized devices, the storage medium extracts the access information from the scrambled access information, and the access device reads/writes digital information from/into the area shown by the access information.

Thereby, when mutual authentication is performed, information for accessing a confidential data storage area is scrambled and transferred. Accordingly, confidentiality of the information for accessing a confidential data storage area can be improved.

If the information for accessing a confidential data storage area is changed into different information and transferred by dishonest impersonation, mutual authentication is not successfully performed. Therefore, the confidential data storage area can be kept from being accessed.

BRIEF DESCRIPTION OF THE DRAWINGS

FIG. 1 shows the external appearances of authentication communication systems 30 and 31 as specific example structures of an authentication communication system 100.

FIG. 2 is a block diagram showing the constructions of a reader/writer apparatus 10 and the memory card 20 which is included in the authenticate communication system 100;

FIG. 3 shows data structures of access information, a random number seed, and random number access information;

FIG. 8 is a flowchart showing an operation which is unique to the authentication communication system 100a;

FIG. 10 is a flowchart showing an operation which is unique to the authentication communication system 100b;

BEST MODE FOR CARRYING OUT THE INVENTION

An authentication communication system 100 is explained below, as an embodiment of the present invention.

1. External Appearance and Usage Pattern of the Authentication Communication System 100

Figure 1A:
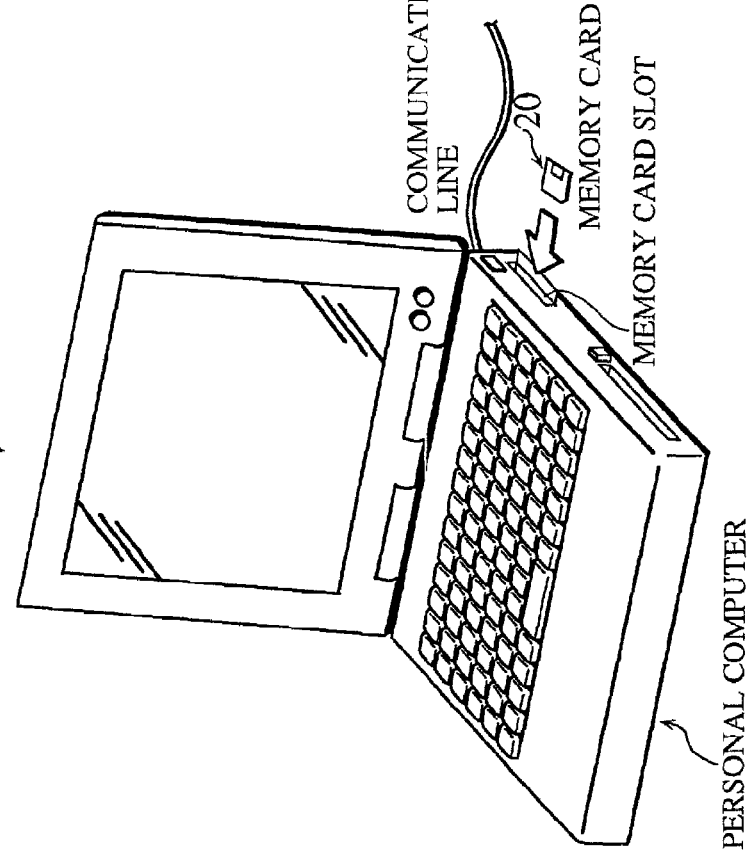
FIG. 1(a) shows the external appearance of the authentication communication system 30 which is roughly composed of a personal computer and a memory card 20.
Figure 1B:
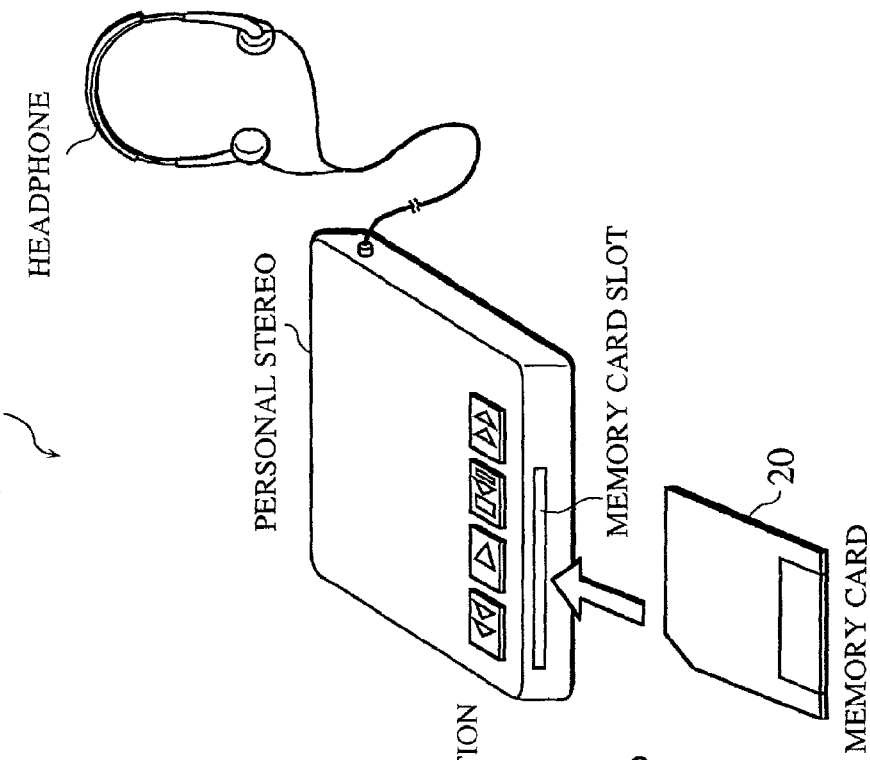
FIG. 1(b) shows the external appearance of the authentication communication system 31 which is roughly composed of a personal stereo, the memory card 20, and a headphone.

The external appearances of authentication communication systems 30 and 31 as specific example constructions of the authentication communication system 100 are shown in FIG. 1(a) and FIG. 1(b).

As shown in FIG. 1(a), the authentication communication system 30 is roughly composed of a personal computer and a memory card 20. The personal computer includes a display unit, a keyboard, a speaker, a microprocessor, a RAM (Random Access Memory), a ROM (Read Only Memory), and a hard disc unit, and is connected to a network such as the Internet via a communication line. The memory card 20 is inserted into a memory card slot to be loaded into the personal computer.

As shown in FIG. 1(b), the authentication communication system 31 is roughly composed of a personal stereo, the memory card 20, and a headphone. The memory card 20 is inserted into a memory card slot to be loaded into the personal stereo. The personal stereo is provided with a plurality of operation buttons on the top face, and connected to the headphone on a side face.

A user loads the memory card 20 into the personal computer, obtains a digital copyright work such as music from an external Web server via the Internet, and writes the digital copyright work into the memory card 20. The user then loads the memory card 20 storing the digital copyright work into the personal stereo, and enjoys playing back the digital copyright work by the personal stereo.

Here, authentication according to a challenge-response authentication protocol is performed between the personal computer and the memory card 20, and between the personal stereo and the memory card 20. Only when the devices mutually authenticate each other, the digital copyright work is transferred between the devices.

2. Construction of the Authentication Communication System 100

As shown in FIG. 2, the authentication communication system 100 is roughly composed of a reader/writer apparatus 10 and the memory card 20. Here, the reader/writer apparatus 10 corresponds to the personal computer or the personal stereo respectively shown in FIGS. 1(a) and (b).

2.1 Construction of the Reading/Writing Apparatus 10

The reader/writer apparatus 10 includes an access information storage unit 101, a random number seed storage unit 102, a combination unit 103, a public key storage unit 104, an encryption unit 105, a random number seed update unit 106, a mutual authentication unit 107, a temporary key generation unit 108, an encryption/decryption unit 109, a data storage unit 110, and an input/output unit 111.

The reader/writer apparatus 10 is equipped with a microprocessor, a RAM, a ROM, and the like. Computer programs are stored in the ROM or the like, and the microprocessor operates in accordance with the computer programs.

(1) Input/Output Unit 111

The input/output unit 111 accepts a user operation, and generates access information for accessing music information which is stored in a data storage unit 209 of the memory card 20. As shown in FIG. 3, the access information is 32 bits long, and is composed of address information showing an address of an area in the data storage unit 209 in the memory card 20 and size information showing a size of the area. The address information is 24 bits long, and the size information is 8 bits long.

The input/output unit 111 also reads music information CT from the data storage unit 110, converts the music information CT into an audio signal, and outputs the audio signal.

In addition, the input/output unit 111 accepts a user operation, obtains music information CT from outside, and writes the music information CT into the data storage unit 110.

(2) Access Information Storage Unit 101

The access information storage unit 101 is equipped with a semiconductor memory, and includes an area to store the access information.

(3) Random Number Seed Storage Unit 102

The random number seed storage unit 102 is equipped with a semiconductor memory, and prestores a 64-bit random number seed shown in FIG. 3. The random number seed is registered when the apparatus is manufactured.

The random number seed storage unit 102 does not allow direct access from outside. In other words, the random number seed storage unit is protected from outside access.

(4) Combination Unit 103

The combination unit 103 reads the access information from the access information storage unit 101 and the random number seed from the random number seed storage unit 102. Next, as shown in the FIG. 3, the combination unit 103 combines the access information and the lower 32 bits of the random number seed, to generate 64-bit random number access information. The combination unit 103 then outputs the random number access information to the encryption unit 105.

(5) Public Key Storage Unit 104

The public key storage unit 104 is equipped with a semiconductor memory, and includes an area to store a 56-bit public key UK. The reader/writer apparatus 10 secretly obtains a public key UK stored in a public key storage unit 201 from the memory card 20, and the public key storage unit 104 stores the public key UK.

The public key storage unit 104 does not allow direct access from outside. In other words, the public key storage unit 104 is protected from outside access.

(6) Encryption Unit 105

The encryption unit 105 reads the public key UK from the public key storage unit 104, and receives the random number access information from the combination unit 103. Next, the encryption unit 105 encrypts the random number access information according to an encryption algorithm E1 using the public key UK, to generate encrypted access information R1. Here, the encryption unit 105 uses DES (Data Encryption Standard) for the encryption algorithm E1.

The encryption unit 105 then outputs the encrypted access information R1 to the mutual authentication unit 107, the random number seed update unit 106, and the temporary key generation unit 108. The encryption unit 105 also outputs the encrypted access information R1 to a decryption unit 205, mutual authentication unit 207, and temporary key generation unit 208 in the memory card 20.

The encrypted access information R1 generated in this way is scrambled information which is obtained by scrambling the access information.

(7) Random Number Seed Update Unit 106

The random number seed update unit 106 receives the encrypted access information R1 from the encryption unit 105, and writes the encrypted access information R1 over the random number seed stored in the random number seed storage unit 102 as a new random number seed.

(8) Mutual Authentication Unit 107

The mutual authentication unit 107 receives the encrypted access information R1, reads the public key UK from the public key storage unit 104, and calculates a response value V2' by evaluating Expression 1 using the encrypted access information R1 and the public key UK.

$$V2'=F1(R1,UK)=\text{SHA}(R1+UK) \quad \text{(Expression 1)}$$

Here, the function F1(a, b) is, for example, a function which combines a and b, and subjects the result of the combination to SHA (Secure Hash Algorithm). Also, "+" is an operator denoting combination.

The mutual authentication unit 107 receives a response value V2 from the mutual authentication unit 207.

The mutual authentication unit 107 then judges whether the response values V2 and V2' match. When they do not match, the mutual authentication unit 107 judges that the memory card 20 is an unauthorized device and prohibits the other construction elements from executing the subsequent operations. When they match, on the other hand, the mutual authentication unit 107 authenticates the memory card 20 as an authorized device and permits the other construction elements to execute the subsequent operations.

Also, the mutual authentication unit 107 receives a random number R2 from a random number generation unit 204, calculates a response value V1 by evaluating Expression 2 using the random number R2 and the public key UK, and outputs the response value V1 to the mutual authentication unit 207.

$$V1=F2(R2,UK)=\text{SHA}(R2+UK) \quad \text{(Expression 2)}$$

(9) Temporary Key Generation Unit 108

The temporary key generation unit 108 receives, when the memory card 20 is authenticated as an authorized device and permitted to execute the operation, the encrypted access information R1 and the random number R2, and generates a temporary key VK by evaluating Expression 3 using the encrypted access information R1 and the random number R2.

$$VK=F3(R1,R2)=\text{SHA}(R1+R2) \quad \text{(Expression 3)}$$

The temporary key generation unit 108 then outputs the temporary key VK to the encryption/decryption unit 109.

(10) Encryption/Decryption Unit 109

The encryption/decryption unit 109 receives the temporary key VK from the temporary key generation unit 108.

The encryption/decryption unit 109 receives encrypted music information EncCT from an encryption/decryption unit 210, decrypts the encrypted music information EncCT according to a decryption algorithm D3 using the temporary key VK to obtain music information CT, and writes the music information CT into the data storage unit 110.

Here, the encryption/decryption unit 109 uses DES for the decryption algorithm D3.

The encryption/decryption unit 109 also reads music information CT from the data storage unit 110, encrypts the music information CT according to an encryption algorithm E2 using the temporary key VK to generate encrypted music information EncCT, and outputs the encrypted music information EncCT to the encryption/decryption unit 210.

Here, the encryption/decryption unit 109 uses DES for the encryption algorithm E2.

(11) Data Storage Unit 110

The data storage unit 110 is equipped with a semiconductor memory, and includes an area to store music information CT.

2.2 Memory Card 20

The memory card 20 includes the public key storage unit 201, a random number seed storage unit 202, a random number seed update unit 203, the random number generation unit 204, the decryption unit 205, a separation unit 206, the mutual authentication unit 207, the temporary key generation unit 208, a data storage unit 209, and the encryption/decryption unit 210.

(1) Public Key Storage Unit 201

The public key storage unit 201 is equipped with a semiconductor memory, and stores a 56-bit public key UK. The public key UK is registered when the memory card 20 is manufactured.

The public key storage unit 201 does not allow direct access from outside. Therefore, the public key storage unit 201 is protected from outside access.

(2) Random Number Seed Storage Unit 201

The random number seed storage unit 202 is equipped with a semiconductor memory, and prestores a 64-bit random number seed. The random number seed is registered when the memory card 20 is manufactured.

The random number seed storage unit 202 does not allow direct access from outside. In other words, the random number seed storage unit is protected from outside access.

(3) Random Number Generation Unit 204

The random number generation unit 204 reads the random number seed from the random number seed storage unit 202, generates a 64-bit random number R2 using the random number seed, outputs the random number R2 to the random number seed update unit 203, the mutual authentication unit 207, and the temporary key generation unit 208. The random number generation unit 204 also outputs the random number R2 to the mutual authentication unit 107 and temporary key generation unit 108 in the reader/writer apparatus 10.

(4) Random Number Seed Update Unit 203

The random number seed update unit 203 receives the random number R2 from the random number generation unit 204 and writes the random number R2 over the random number seed stored in the random number seed storage unit 202 as a new random number seed.

(5) Decryption Unit 205

The decryption unit 205 reads the public key UK from the public key storage unit 201, and receives the encrypted access information R1 from the encryption unit 105. Next, the decryption unit 205 decrypts the encrypted access information R1 according to a decryption algorithm D1 using the public key UK to obtain the random number access information, and outputs the random number access information to the separation unit 206.

Here, the decryption unit 205 uses DES for the decryption algorithm Dl. The decryption algorithm D1 decrypts a cryptogram which is generated by the encryption algorithm E1.

(6) Separation Unit 206

The separation unit 206 receives the random number access information from the decryption unit 205, separates the upper 32 bits of data from the random number access information as the access information, and outputs the access information to the data storage unit 209.

(7) Mutual Authentication Unit 207

The mutual authentication unit 207 reads the public key UK from the public key storage unit 201, receives the encrypted access information R1, calculates the response value V2 by evaluating Expression 4 using the encrypted access information R1 and the public key UK, and outputs the response value V2 to the mutual authentication unit 107 in the reader/writer apparatus.

$$V2=F1(R1,UK)=\text{SHA}(R1+UK) \quad \text{(Expression 4)}$$

Here, this function F1 is equal to the function F1 in Expression 1.

Also, the mutual authentication unit 207 receives the random number R2 from the random number generation unit 204 and calculates the response value V1' by evaluating Expression 5 using the random number R2 and the public key UK.

$$V1'=F2(R2,UK)=SHA(R2+UK) \quad \text{(Expression 5)}$$

Here, this function F2 is equal to the function F2 in Expression 2.

Next, the mutual authentication unit 207 receives the response value V1 from the mutual authentication unit 107 and judges whether the response values V1 and V1' match. When they do not match, the mutual authentication unit 207 judges that the reader/writer apparatus 10 is an unauthorized device and prohibits the other construction elements from executing the subsequent operations. When they match, the mutual authentication unit 207 authenticates the reader/writer apparatus 10 as an authorized device and permits the construction elements to execute the subsequent operations.

(8) Temporary Key Generation Unit 208

The temporary key generation unit 208 receives, when the reader/writer apparatus 10 is authenticated as an authorized device and permitted to execute the operation, the encrypted access information R1 and the random number R2, and generates a temporary key VK by evaluating Expression 6 using the encrypted access information R1 and the random number R2.

$$VK=F3(R1,R2)=SHA(R1+R2) \quad \text{(Expression 6)}$$

Here, this function F3 is equal to the function F3 in Expression 3.

The temporary key generation unit 208 then outputs the temporary key VK to the encryption/decryption unit 210.

(9) Data Storage Unit 209

The data storage unit 209 is equipped with a semiconductor memory, and includes an area to store music information CT.

(10) Encryption/Decryption Unit 210

The encryption/decryption unit 210 receives the temporary key VK from the temporary key generation unit 208.

The encryption/decryption unit 210 receives the encrypted music information EncCT from the encryption/decryption unit 109, decrypts the encrypted music information EncCT according to a decryption algorithm D2 using the temporary key VK to obtain the music information CT, and writes the music information CT into the area in the data storage unit 209 shown by the access information.

Here, the encryption/decryption unit 210 uses DES for the decryption algorithm D2. The decryption algorithm D2 decrypts a cryptogram which is generated by the encryption algorithm E2.

Also, the encryption/decryption unit 210 reads music information CT from the area in the data storage unit 209 shown by the access information, encrypts the music information CT according to an encryption algorithm E3 to generate the encrypted music information EncCT, and outputs the encrypted music information EncCT to the encryption/decryption unit 109.

Here, the encryption/decryption unit 210 uses DES for the encryption algorithm E3. The decryption algorithm D3 decrypts a cryptogram which is generated by the encryption algorithm E3.

3. Operation of the Authentication Communication System 100

(1) Reading Operation

An operation of the reader/writer apparatus 10 and the memory card 20 which are included in the authentication communication system 100 is explained with reference to FIGS. 4 and 5.

Here, it is assumed that the reader/writer apparatus 10 is, like the personal stereo shown in FIG. 1(*b*), an apparatus for reading information stored in a memory card.

The combination unit 103 reads a random number seed from the random number seed storage unit 102, reads access information from the access information storage unit 101, and combines the random number seed and the access information, to generate random number access information (Step S101). The encryption unit reads a public key from the public key storage unit 104, and encrypts the random number access information using the public key, to generate encrypted access information R1 (Step S102). The mutual authentication unit 107 calculates V2'=F1(R1) (Step S103). The random number update unit 106 writes the random number access information over the random number seed stored in the random number seed storage unit 102 as a new random number seed (Step S104).

The encryption unit 105 outputs the encrypted access information R1 to the memory card 20, and the mutual 110 authentication unit 207 in the memory card 20 receives the encrypted access information R1 (Step S105).

The mutual authentication unit 207 calculates V2=F1(R1) (Step S106), and outputs the response value V2 to the mutual authentication unit 107 in the reader/writer apparatus 10 (Step S107).

The mutual authentication unit 107 judges whether the response values V2 and V2' match. When they do not match (Step S108), the mutual authentication unit 107 judges that the memory card 20 is an unauthorized device and cancels the subsequent operations.

When they match (Step S108), the mutual authentication unit 107 authenticates the memory card 20 as an authorized device. After that, the random number generation unit 204 in the memory card 20 reads a random number seed from the random number seed storage unit 202 and generates a random number R2 using the random number seed (Step S109). The mutual authentication unit 207 calculates V1'=F2(R2) (Step S110). The random number seed update unit 203 writes the random number R2 over the random number seed stored in the random number seed storage unit 202 as a new random number seed (Step S111). Next, the random number generation unit 204 outputs the random number R2 to the mutual authentication unit 107 in the reader/writer apparatus 10, and the mutual authentication unit 107 receives the random number R2 (Step S112). The mutual authentication unit 107 generates V1=F2(R2) (Step S113) and outputs the response value V1 to the mutual authentication unit 207 of the memory card 20, and the mutual authentication unit 207 receives the response value V1 (Step S114).

Next, the mutual authentication unit 207 judges whether the response values V1 and V1' match. When they do not match (Step S115), the mutual authentication unit 207 judges that the reader/writer apparatus 10 is an unauthorized device and cancels the subsequent operations.

When they match (Step S115), the mutual authentication unit 207 authenticates the reader/writer apparatus as an authorized device. After that, the temporary key generation unit 108 in the reader/writer apparatus 10 generates a temporary key VK using the encrypted access information R1 and the random number R2 (Step S121). The decryption unit 205 in the memory card 20 reads a public key UK from the public key storage unit 201 and decrypts the encrypted access information R1 using the public key UK to obtain the random number access information (Step S122). The separation unit 206 separates the access information from the random number access information (Step S123). The temporary key generation unit 208 generates a temporary key VK using the encrypted access information R1 and the random number R2 (Step S124). The encryption/decryption unit 210 reads music information CT from the area in the data storage unit 209 shown by the access information (Step S125). The encryption/decryption unit 210 encrypts the music information CT using the temporary key VK to generate encrypted music information EncCT (Step S126), and outputs the generated encrypted music information EncCT to the encryption/decryption unit 109 in the reader/writer apparatus 10 (Step S127).

The encryption/decryption unit 109 decrypts the encrypted music information EncCT using the temporary key VK to obtain the music information CT, and writes it into the data storage unit 110 (Step S128). The input/output unit 111 reads the music information CT, converts the read music information CT into an audio signal, and outputs it (Step S129).

(2) Writing Operation

Another operation of the reader/writer apparatus 10 and the memory card 20 which are included in the authentication communication system 100 is explained with reference to FIG. 6.

Here, the explanation is given assuming that the reader/writer apparatus 10 is, like the personal computer shown in FIG. 1(a), an apparatus for writing information into a memory card. Since the reading operation and the writing operation are similar, only the differences are explained.

Figure 4:
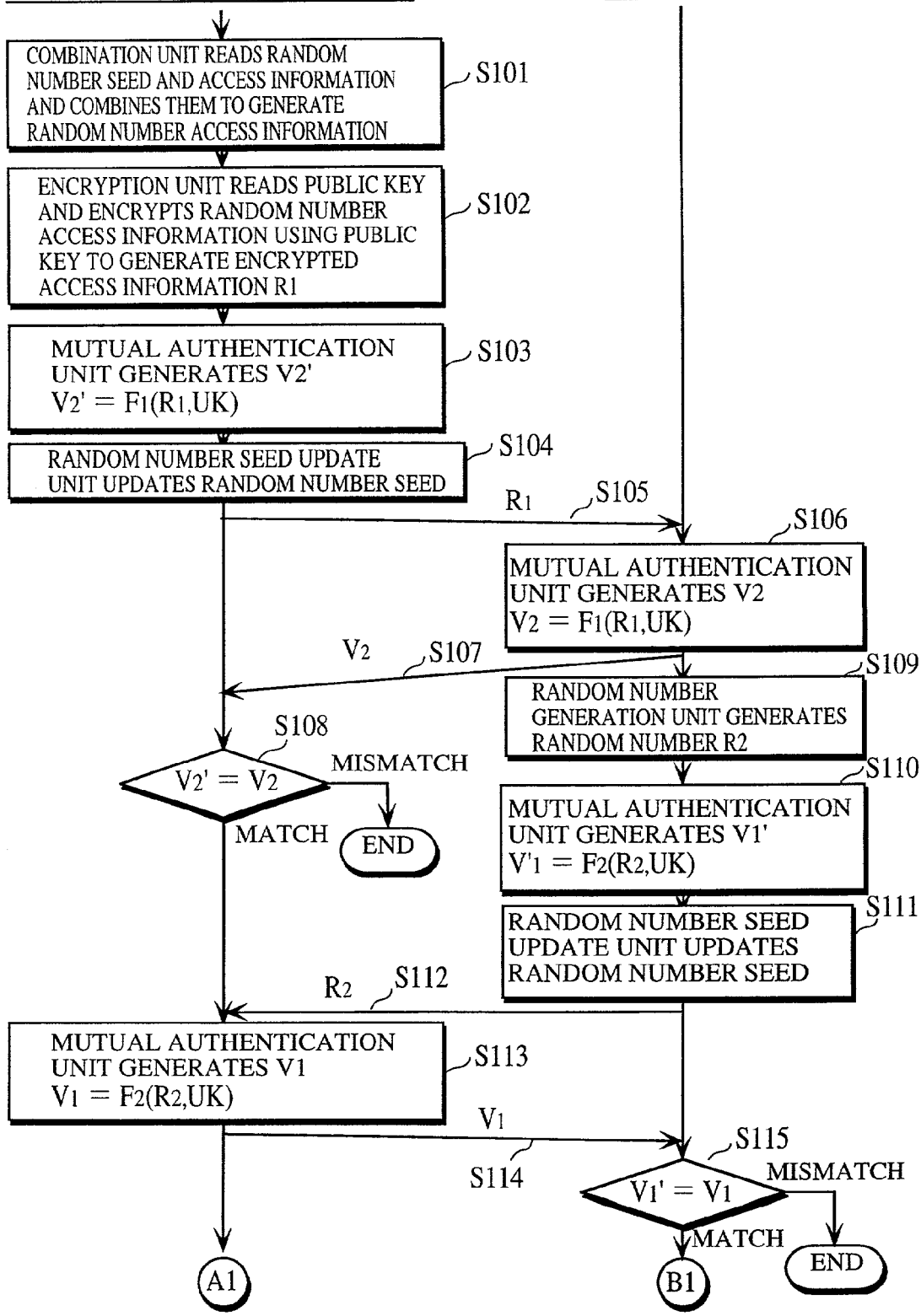
FIG. 4 is a flowchart showing an operation of the authentication communication system 100 in particular assuming that information stored in a memory card is read, which is continued in FIG. 5.
Figure 5:
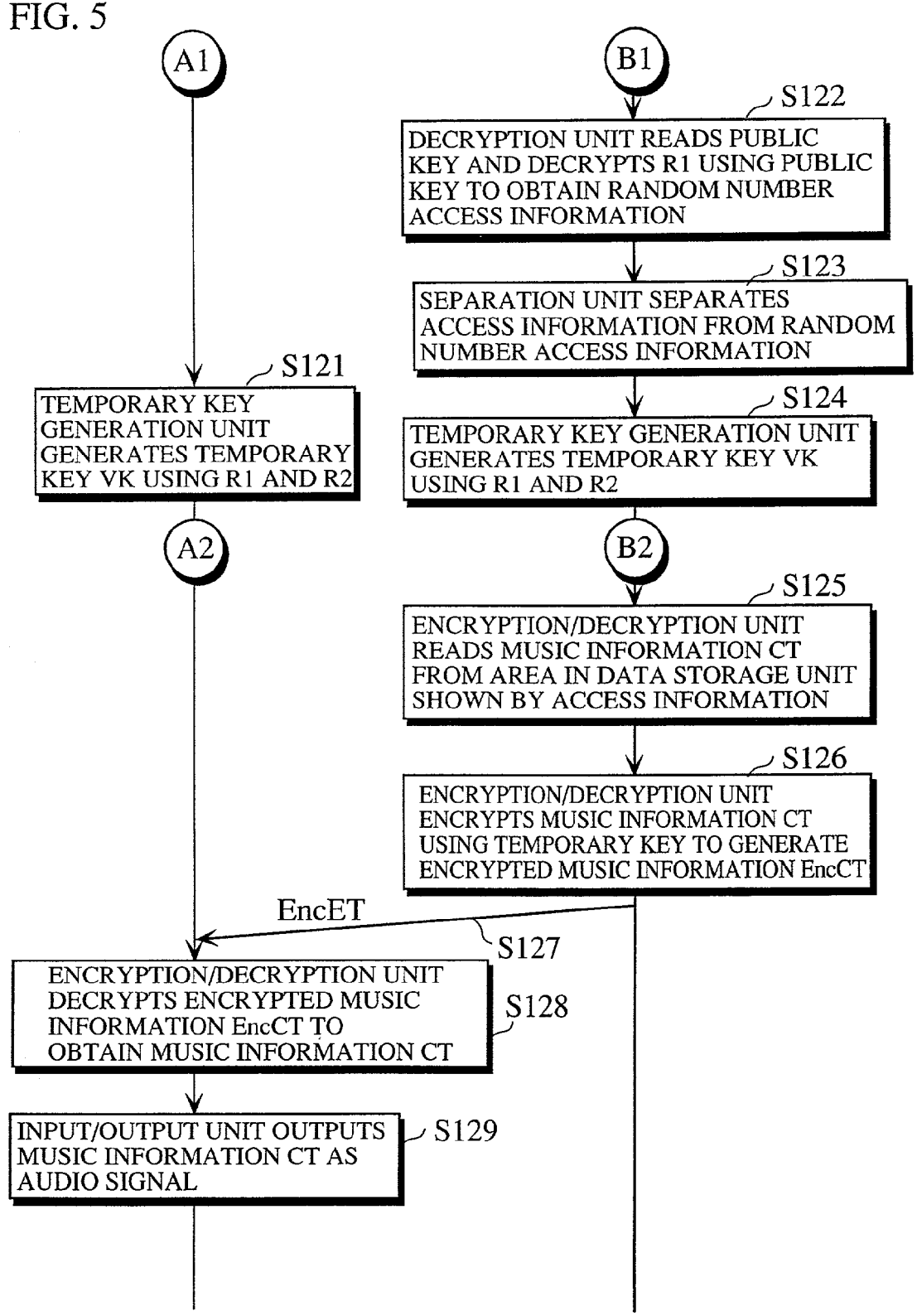
FIG. 5 is continuation of the flowchart in FIG. 4 showing the operation of the authentication communication system 100.
Figure 6:
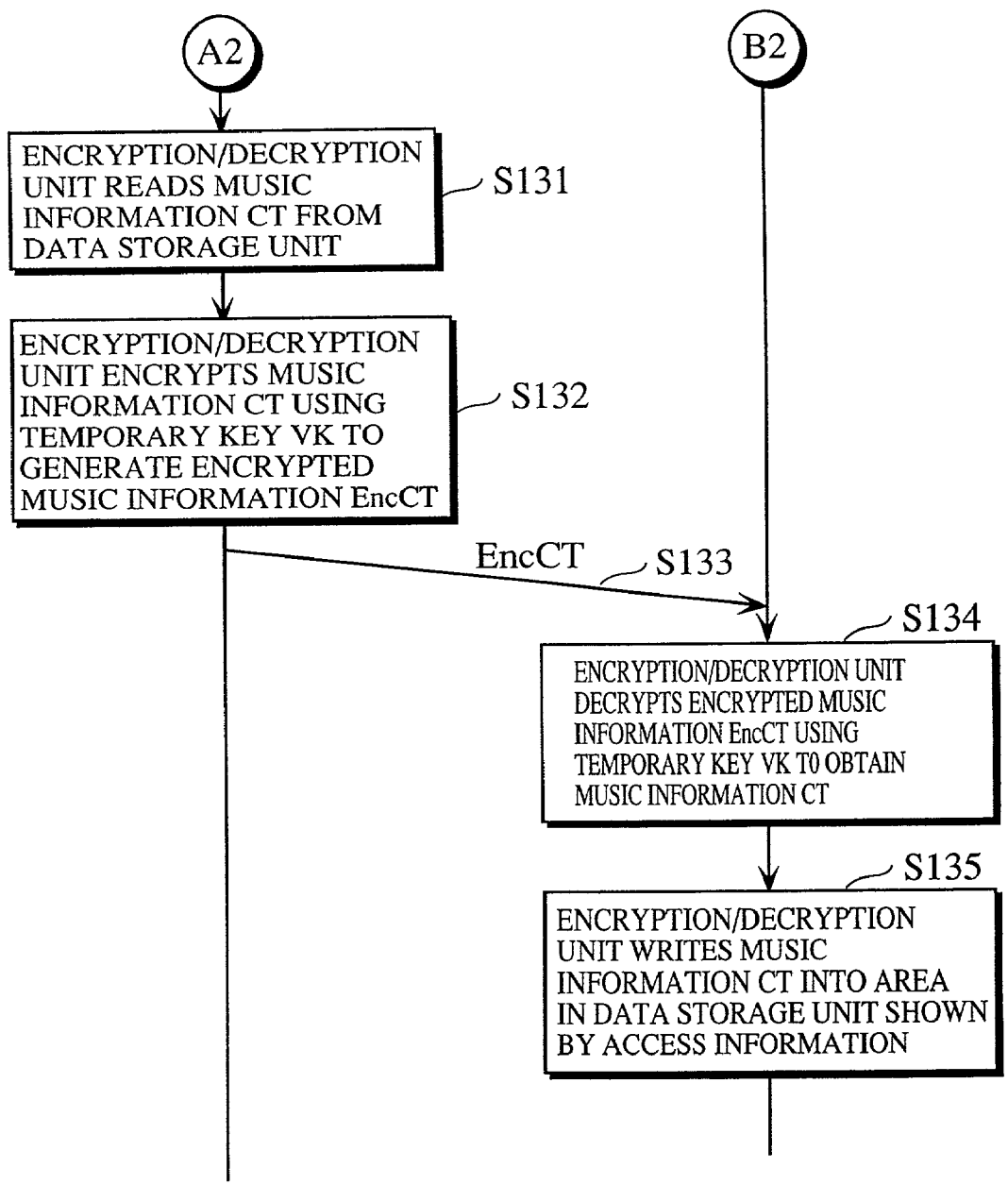
FIG. 6 is a flowchart showing another operation of the authentication communication system 100 in particular assuming that the reader/writer apparatus 10 is an apparatus for writing information into a memory card.

A flowchart obtained by replacing Steps S125 to S129 in the flowchart shown in FIGS. 4 and 5 with steps shown in FIG. 6 illustrates the writing operation of the authentication communication system 100.

The encryption/decryption unit 109 reads music information CT from the data storage unit 110 (Step S131), encrypts the music information CT using the temporary key VK to generate encrypted music information CT (Step S132), and outputs the encrypted music information to the encryption/decryption unit 210 in the memory card 20, and the encryption/decryption unit 210 receives the encrypted music information CT (Step S133).

The encryption/decryption unit 210 decrypts the encrypted music information EncCT using the temporary key VK to obtain the music information CT (Step S134), and writes the obtained music information CT into the area in the data storage unit 209 shown by the access information (Step S135)

4. Summary

As described above, when mutual authentication is performed, information for accessing a confidential data storage area storing confidential data is scrambled and transferred, so that confidentiality of the information for accessing confidential data storage area can be improved.

If the information for accessing a confidential data storage area is changed into different information and transferred by dishonest impersonation, mutual authentication is not successfully performed. Accordingly, this system can prevent the confidential data storage area from being accessed.

When a random number is updated, access information for accessing a confidential data storage area is not used. Therefore, periodicity of the random number can be improved.

5. Authentication Communication System 100a

An authentication communication system 100a is explained below, as a modification of the authentication communication system 100.

5.1 Construction of the Authentication Communication System 100

Figure 7:
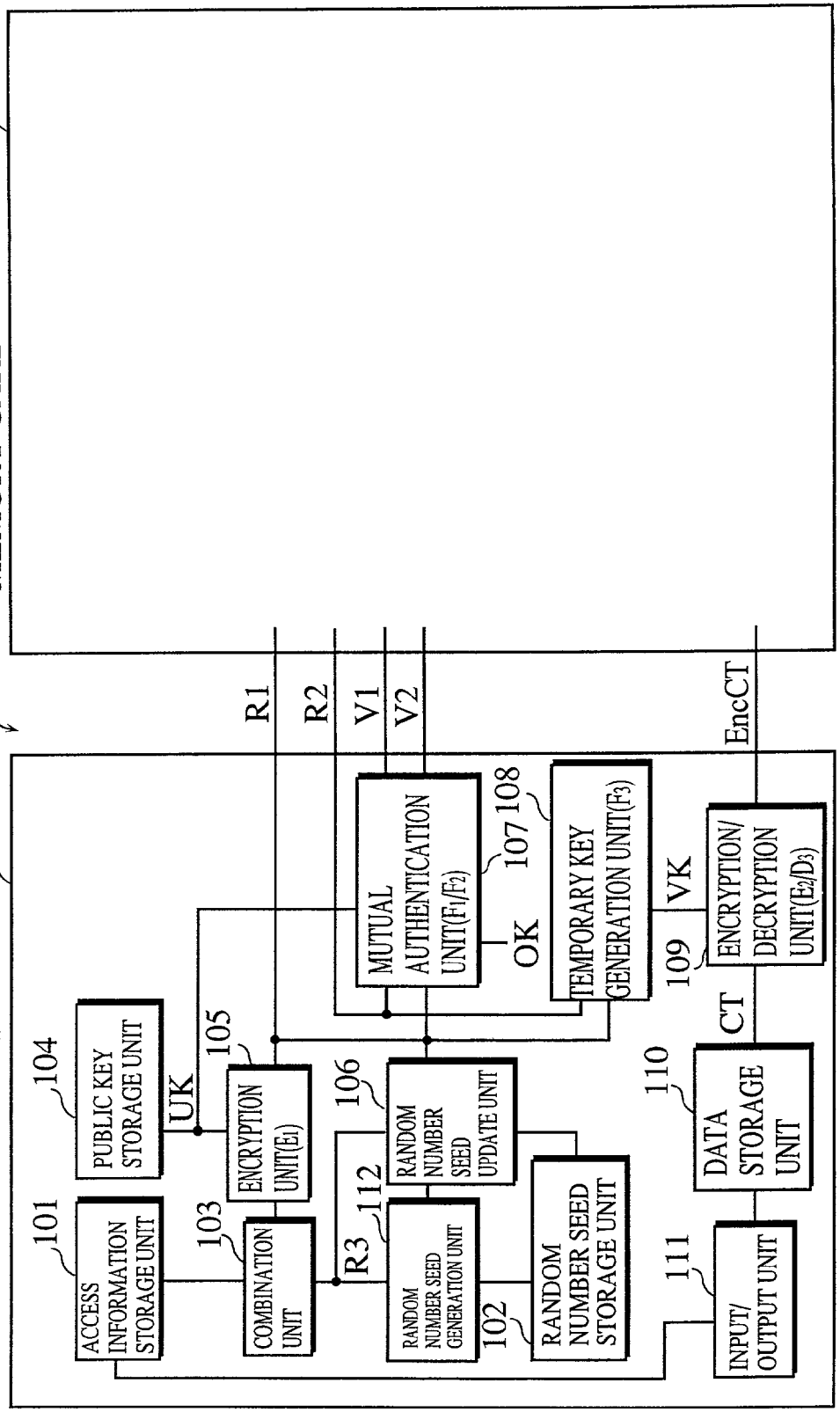
FIG. 7 is a block diagram of the construction of an authentication communication system 100a as another embodiment.

The authentication communication system 100a is, as shown in FIG. 7, roughly composed of a reader/writer apparatus 10a and the memory card 20.

The memory card 20 is the same as the memory card 20 shown in FIG. 2. So, the explanation of the memory card 20 is omitted here.

The reader/writer apparatus 10a includes an access information storage unit 101, a random number seed storage unit 102, a combination unit 103, a public key storage unit 104, an encryption unit 105, a random number seed update unit 106, a mutual authentication unit 107, a temporary key generation unit 108, an encryption/decryption unit 109, a data storage unit 110, an input/output unit 111, and a random number generation unit 112.

The following explanation focuses on the differences from the reader/writer apparatus 10. The other points are the same as those of the reader/writer apparatus 10. So, the explanation of them are omitted here.

(1) Random Number Generation Unit 112

The random number generation unit 112 reads a random number seed from the random number seed storage unit 102, generates a 64-bit random number using the random number seed, and outputs the random number to the combination unit 103 and the random number update unit 106.

(2) Random Number Seed Update Unit 106

The random number seed update unit 106 receives the random number from the random number generation unit 112, and writes the random number over the random number seed stored in the random number seed storage unit 102 as a new random number seed.

(3) Combination Unit 103

The combination unit 103 receives the random number from the random number generation unit 112, reads the access information from the access information storage unit 101, and combines the random number and the access information, to generate random number access information.

5.2 Operation of the Authentication Communication System 100a

Figure 8:
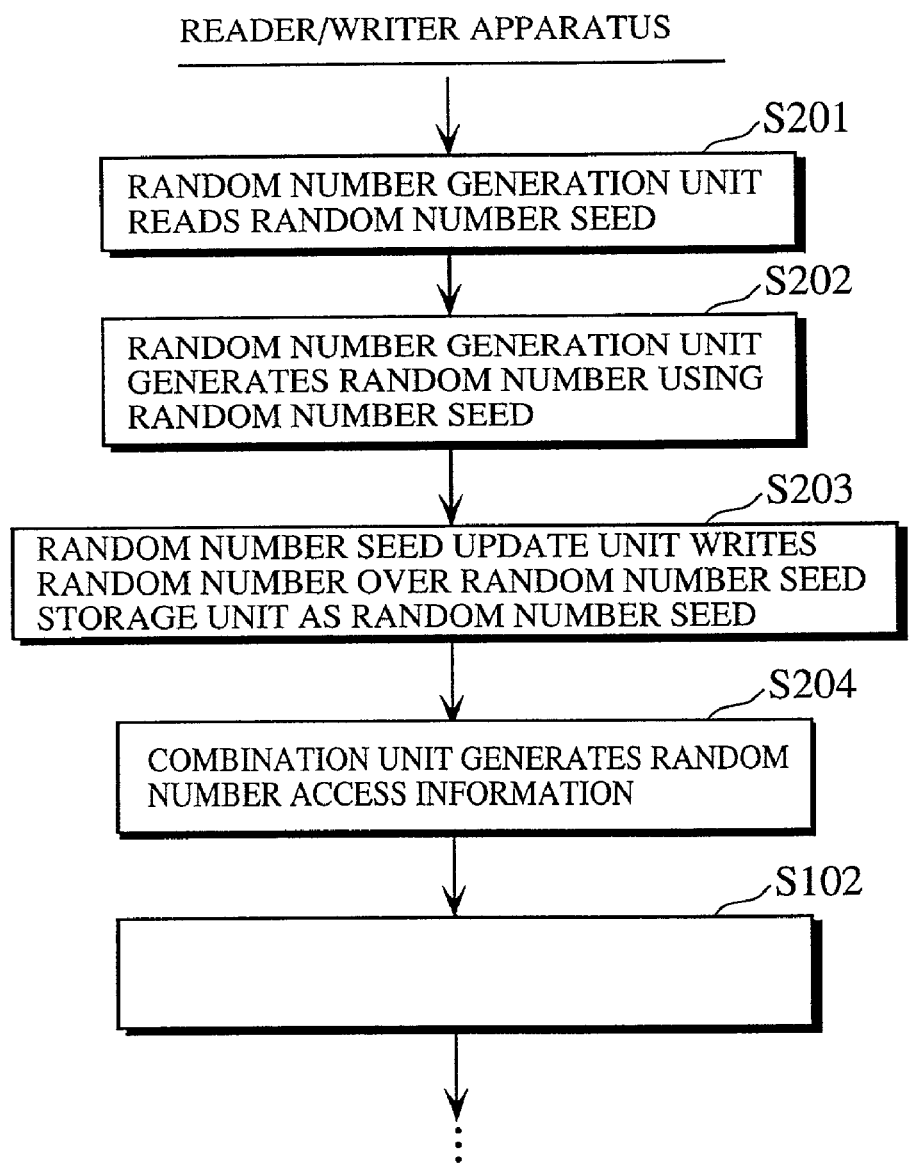

An operation of the authentication communication system 100a is explained with reference to FIG. 8.

The random number generation unit 112 reads a random number seed from the random number seed storage unit 102 (Step S201), and generates a 64-bit random number using the random number seed (Step S202). The random number seed update unit 106 receives the random number from the random number generation unit 112, and writes the random number over the random number seed stored in the random number seed storage unit 102 as a new random number seed (Step S203). Next, the combination unit 103 receives the random number from the random number generation unit 112, reads access information from the access information storage unit 101, and combines the random number and the access information, to generate random access information (Step S204).

It is then followed by Step S102 in FIG. 4. The subsequent steps are the same as those of the authentication communication system 100. So the explanation of them are omitted here.

5.3 Summary

As described above, when the random number is updated, access information for accessing a confidential data storage area is not used. Therefore, periodicity of the random number can be improved.

6. Authentication Communication System 100b

An authentication communication system 100b is explained below, as a modification of the authentication communication system 100a.

6.1 Construction of the Authentication Communication System 100b

Figure 9:
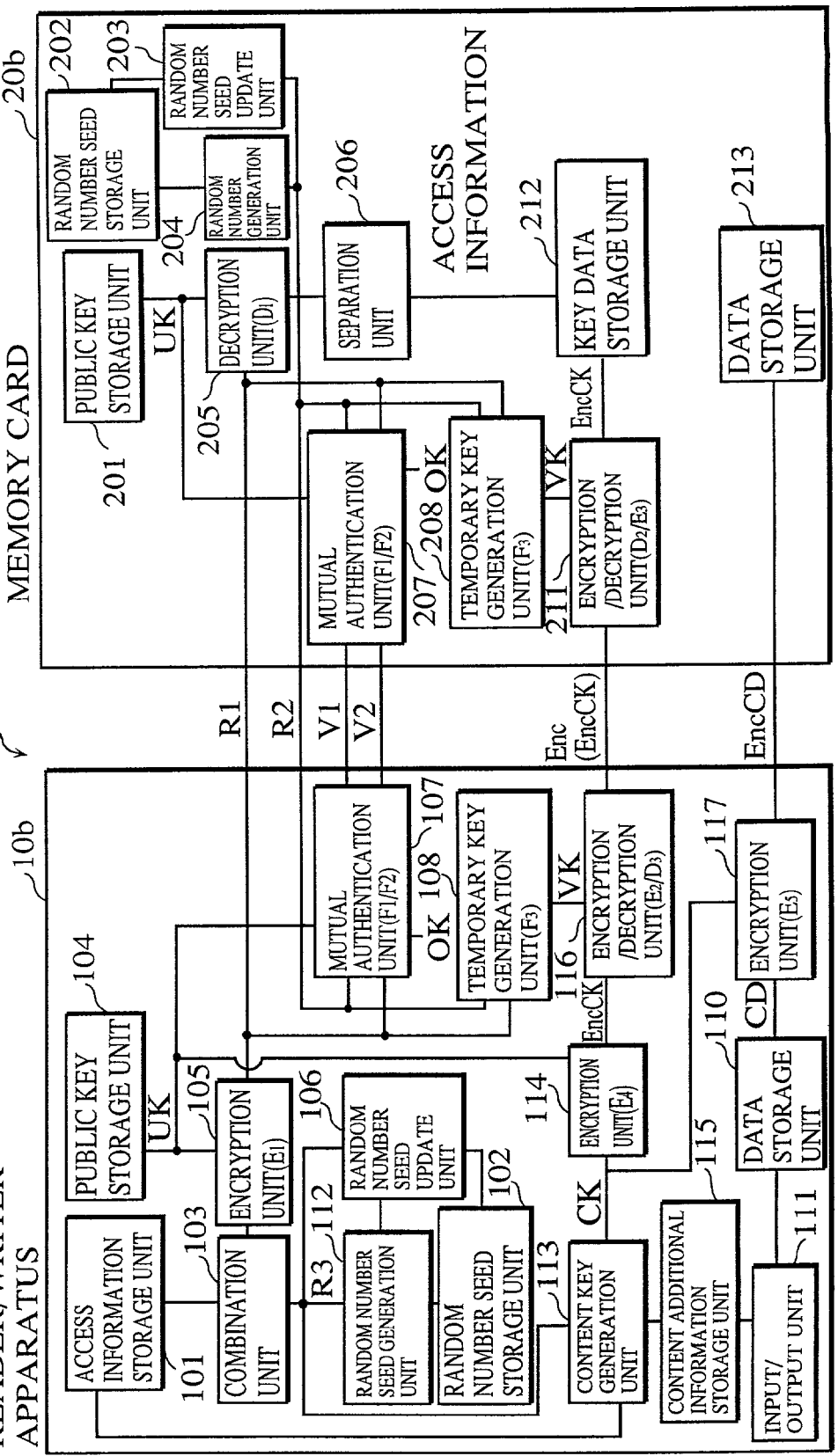
FIG. 9 is a block diagram of the construction of an authentication communication system 100b as another embodiment.

The authentication communication system 100b is, as shown in FIG. 9, roughly composed of a reader/writer apparatus 10b and a memory card 20b.

(1) Construction of the Reader/Writer Apparatus 10b

The reader/writer apparatus 10b includes an access information storage unit 101, a random number seed storage unit 102, a combination unit 103, a public key storage unit 104, an encryption unit 105, a random number seed update unit 106, a mutual authentication unit 107, a temporary key generation unit 108, a data storage unit 110, an input/output unit 111, a random number generation unit 112, a content key generation unit 113, an encryption unit 114, a content additional information storage unit 115, an encryption/decryption unit 116, and an encryption unit 117.

The following explanation focuses on the differences from the reader/writer apparatus 10a. The other points are the same as those of the reader/writer apparatus 10a. So, the explanation of them are omitted here.

(a) Input/Output Unit 111

The input/output unit 111 accepts input of content additional information by a user operation, and writes the content additional information into the content additional information storage unit 115.

Here, content additional information shows, for example, the number of times a content has been reproduced and length of time the content has been used. The content additional information is 8 bits long.

The input/output unit 111 also obtains content data CD according to a user operation, and writes the content data CD into the data storage unit 110.

Here, the content data CD is, for example, music content information.

(b) Random Number Generation Unit 112

The random number generation unit 112 outputs the random number R3 to the content key generation unit 113.

(c) Content Key Generation Unit 113

The content key generation unit 113 reads the content additional information from the content additional information storage unit 115, receives the random number R3 from the random number generation unit 112, and generates a content key CK by evaluating Expression 7 using the random number R3 and the content additional information. Here, the content key CK is 64 bits long.

$CK=F4(R3,$ content additional information)=content additional information (8 bits long)+the lower 56 bits of $R3.$ (Expression 7)

Here, "+" is an operator denoting combination of data and data.

Next, the content key generation unit 113 outputs the content key CK to the encryption unit 114 and the encryption unit 117.

(d) Encryption Unit 114

The encryption unit 114 receives the content key CK from the content key generation unit 113, reads the public key UK from the public key storage unit 104, encrypts the content key CK according to an encryption algorithm E4 using the public key UK to generate an encrypted content key EncCK, and outputs the encrypted content key EncCK to the decryption unit 116.

Here, the encryption unit 114 uses DES for the encryption algorithm E4.

(e) Encryption/Decryption Unit 116

The encryption/decryption unit 116 receives the encrypted content key EncCK from the encryption unit 114, encrypts the encrypted content key EncCK according to an encryption algorithm E2 using the temporary key VK to generate a double-encrypted content key Enc(EncCK), and outputs the double-encrypted content key Enc (EncCK) to the encryption/decryption unit 211.

Here, the encryption/decryption unit 116 uses DES for the encryption algorithm E2.

(f) Encryption Unit 117

The encryption unit 117 reads the content data CD from the data storage unit 110 and encrypts the content data CD according to an encryption algorithm E5 using the content key CK to generate encrypted content data EncCD. Then, the encryption unit 117 outputs the encrypted content data EncCD to the data storage unit 213.

Here, the encryption unit 117 uses DES for the encryption algorithm E5.

(2) Construction of the Memory Card 20b

The memory card 20b includes a public key storage unit 201, a random number seed storage unit 202, a random number seed update unit 203, a random number generation unit 204, a decryption unit 205, a separation unit 206, a mutual authentication unit 207, a temporary key generation unit 208, an encryption/decryption unit 211, a key data storage unit 212, and a data storage unit 213.

The following explanation focuses on the differences from the memory card 20. The other points are the same as those of the memory card 20. So, the explanation of them are omitted.

(a) Temporary Key Generation Unit 208

The temporary key generation unit 208 outputs the temporary key VK to the encryption/decryption unit 211.

(b) Encryption/Decryption Unit 211 The encryption/decryption unit 211 receives the temporary key VK from the temporary key generation unit 208 and the double-encrypted content key Enc(EncCK) from the encryption/decryption unit 116.

Next, the encryption/decryption unit 211 decrypts the double-encrypted content key Enc(EncCK) according to a decryption algorithm D2 using the temporary key VK to obtain the encrypted content key EncCK and writes the encrypted content key EncCK into an area in the key data storage unit 212 shown by the access information.

(c) Key Data Storage Unit 212

The key data storage unit 212 includes an area to store encrypted content key EncCK.

(d) Data Storage Unit 213

The data storage unit 213 receives the encrypted content data EncCD and stores the encrypted content data EncCD.

6.2 Operation of the Authentication Communication System 100b

An operation of the authentication communication system 100b is similar to that of the authentication communication system 100a. So, only the differences from the authentication communication system 100a are explained here.

The operation of the authentication communication system 100b is illustrated by a flowchart obtained by replacing steps S121 and onwards in the flowchart showing the operation of the authentication communication system 10a with the flowchart shown in FIG. 10.

The content key generation unit 113 reads content additional information from the content additional information storage unit 115 (Step S301). The random number generation unit 112 outputs the random number R3 to the content key generation unit 113. The content key generation unit 113 receives the random number R3 from the random number generation unit 112, generates a content key CK using the random number R3 and the content key CK, and outputs the content key CK to the encryption unit 114 and the encryption unit 117 (Step S302). The encryption unit 114 receives the content key CK from the content key generation unit 113, reads the public key UK from the public key storage unit 104, encrypts the content key CK according to an encryption algorithm E4 using the public key UK to generate encrypted content key EncCK, and outputs the encrypted content key EncCK to the encryption/decryption unit 116(Step S303). Next, the encryption/decryption unit 116 receives the encrypted content key EncCK, encrypts the encrypted content key EncCK according to an encryption algorithm E2 using the temporary key VK, to generate a double-encrypted content key Enc(EncCK) (Step S304). The encryption/decryption unit 116 then outputs the double-encrypted content key Enc(EncCK) to the encryption/decryption unit 211, and the encryption/decryption unit 211 receives the double-encrypted content key Enc(EncCK) (Step S305). The encryption/decryption unit 211 decrypts the double-encrypted content key Enc(EncCK) according to a decryption algorithm D2 using the temporary key VK to obtain the encrypted content key EncCK, and writes the encrypted content key EncCK into the area in the key data storage unit 212 shown by the access information (Step S306).

The encryption unit 117 reads content data CD from the data storage unit 110 (Step S307) and encrypts the content data CD according to an encryption algorithm E5 using the content key CK, to generate encrypted content data EncCD (Step S308). The encryption unit 117 outputs the encrypted content data EncCD to the data storage unit 213, and the data storage unit 213 receives the encrypted content data EncCD (Step S309). The data storage unit 213 stores the encrypted content data EncCD(Step S310).

6.3 Summary

As described above, the authentication communication system 100b does not need another random number generation mechanism for generating a content key to encrypt content data. The random number generation mechanism used for combining access information can double as that for generating the content key.

7. Other Modifications

Although the present invention has been described based on the above embodiments, the present invention is, of course, not limited to the above embodiments. The following cases are also included in the present invention.

(1) Although a digital copyright work is music information in the above embodiments, it may be character data, such as a novel and a thesis, computer program software for a computer game, compressed audio data represented by MP3 (Moving Picture experts group audio layer 3), a still picture of JPEG (Joint Photographic Experts Group) format or the like, or a moving picture of MPEG (Moving Picture Experts Group) format or the like.

Also, the reader/writer apparatus is not limited to a personal computer, and may be an output device for selling or distributing the above variety of digital copyright works.

Additionally, the reader/writer apparatus is not limited to a personal stereo and may be a reproduction device for reproducing the digital copyright works. For example, it may be a computer game device, a belt-typed information terminal, a dedicated terminal, or a personal computer. The reader/writer apparatus may include both functions of the above output device and reproduction device.

(2) In the above embodiments, DES is used for the encryption/decryption algorithms. However, other ciphers may be used instead.

Also, SHA is used in the above embodiments. However, other one-way functions may be used instead.

Although a public key and a temporary key are 56 bits long, different length of keys may be used.

(3) Although the combination unit 103 combines access information and the lower 32 bits of random number seed to generate a 64-bit random access information in the above embodiment, it is not limited to this. It may be done as follows.

The combination unit 103 may combine 32-bit access information and the lower 32 bits of a random number seed so that each bit thereof is alternately arranged, to generate 64-bit random access information.

The combination unit 103 may also combine the 32-bit access information and the lower 32 bits of a random number seed so that groups of bits thereof are alternately arranged. In these cases, the separation unit 206 inversely performs the operation of the combination unit 103.

(4) Although the random number generation unit 204 in the memory card 20 generates a random number R2 using a random number seed stored in the random number seed storage unit 202 in the above embodiments, the random number generation unit 204 may generate the random number R2 as a random number seed.

Also, although the temporary key generation units 108 and 208 generate a temporary key using the encrypted access information R1 and the random number R2, they may use response values. They may use a public key UK, too.

(5) In the authentication communication system 100b, the encryption unit 117 writes encrypted content data EncCD into the data storage unit 213. However, the encryption unit 117 may treat the encrypted content data EncCD as confidential data and write it into an area shown by access information.

Also, the encryption unit 117 may write the encrypted content data EncCD into the data storage unit 213 without treating it as confidential data.

In addition, either of the encryption units 114 or 117 does not need to be provided, and the remained encryption unit may double as the other.

(6) The present invention may be the method shown in the above embodiments. Furthermore, the present invention may be a computer program which realizes this method on a computer, and may be a digital signal constituting the computer program.

Also, the present invention may be a computer-readable storage medium, for example, a floppy disk, a hard disc, a CD-ROM (Compact Disc-Read Only Memory), an MO (Magneto-Optical) disc, a DVD (Digital Versatile Disc), a DVD-ROM, a DVD-RAM, or a semiconductor memory, in which the computer program or the digital signal is stored. Conversely, the present invention may also be the computer program or the digital signal stored in these storage media.

Moreover, the present invention may be realized by transmitting the computer program or the digital signal via a network, such as an electric communication network, a wired or wireless communication network, or the Internet.

Furthermore, the present invention may be a computer system equipped with a microprocessor and a memory. The memory stores the computer program, and the microprocessor operates in accordance with the computer program.

The present invention may be implemented on another independent computer system by transferring the computer program or the digital signal stored in any of the storage media, or by transmitting the computer program or the digital signal via the network or the like.

(4) Various combinations of the above embodiments and the above modifications are possible.

INDUSTRIAL APPLICABILITY

The present invention can be used for mutual authentication between an output device which outputs digital copyright works and a semiconductor storage medium before duplicating a digital copyright work from the output device into the semiconductor storage medium. In addition, the present invention can be used for mutual authentication between a semiconductor storage medium which stores a digital copyright work and a reproduction device before reading the digital copyright work from the semiconductor storage medium and reproducing the digital copyright work.

The invention claimed is:

1. An authentication communication method comprising:
    transmitting scrambled access information from an access apparatus to a storage medium, the scrambled access information generated by scrambling access information, the access information including information designating an area in the storage medium used for storing digital information;
    authenticating, in the access apparatus, whether the storage medium is authorized according to a challenge-response authentication protocol using the scrambled access information;
    authenticating, in the storage medium, whether the access apparatus is authorized according to a challenge-response authentication protocol without using the scrambled access information; and
    reading/writing the digital information from/into the area designated by the access information after the storage medium and the access apparatus have authenticated each other as authorized devices.

2. An authentication communication method according to claim 1, wherein:
    said authenticating, in the access apparatus, whether the storage medium is authorized according to the challenge-response authentication protocol includes comparing a first response value and a second response value;
    said first response value is calculated in the storage medium using the scrambled access information; and
    said second response value is calculated in the access apparatus using the scrambled access information.

3. An authentication communication method according to claim 1,
    wherein the access information includes information designating an address and a size of the area of the storage medium.

4. An authentication communication system comprising: a storage medium; and
    an access apparatus operable to read/write digital information from/into the storage medium;
    said storage medium comprising:
        an area for storing the digital information; and
        a first authentication unit operable to authenticate whether the access apparatus is authorized according to a challenge-response authentication protocol without using scrambled access information; and
    said access apparatus comprising:
        a transmitting unit operable to transmit the scrambled access information to said storage medium, the scrambled access information generated by scrambling access information, the access information including information designating an area in said storage medium used for storing digital information;
        a second authentication unit operable to authenticate whether said storage medium is authorized according to a challenge-response authentication protocol using the scrambled access information; and
        an accessing unit operable to read/write the digital information from/into the area designated by the access information after said storage medium and said access apparatus have authenticated each other as authorized devices.

5. An authentication communication system according to claim 4, wherein:
    said first authentication unit is operable to calculate a first response value using the scrambled access information and send the first response value to said second authentication unit of said access apparatus;
    said second authentication unit is operable to calculate a second response value using the scrambled access information; and
    said second authentication unit is operable to authenticate whether said storage medium is authorized according to the challenge-response authentication protocol in which the first response value and the second response value are compared.

6. An authentication communication system according to claim 4,
    wherein the access information includes information designating an address and a size of the area included in the storage medium.

7. An authentication communication program stored in a computer-readable storage medium, said program comprising:
    a transmitting program code operable to transmit scrambled access information from an access apparatus to a storage medium, the scrambled access information generated by scrambling access information, the access information including information designating an area in the storage medium used for storing digital information;
    a first authenticating program code operable to authenticate whether the storage medium is authorized according to a challenge-response authentication protocol using the scrambled access information;
    a second authenticating program code operable to authenticate whether the access apparatus is authorized according to a challenge-response authentication protocol without using the scrambled access information; and
    a reading/writing program code operable to read/write the digital information from/into the area designated by the access information after the storage medium and the access apparatus have authenticated each other as authorized devices.

* * * * *